Patented Mar. 12, 1946

2,396,248

UNITED STATES PATENT OFFICE 2,396,248

FIBER-FORMING POLYMERS AND METHOD OF MAKING THEM

Robert Edward Christ, Wilmington, Del., assignor to E. I. du Pont de Nemours & Company, Wilmington, Del., a corporation of Delaware No Drawing. Application April 22, 1940, Serial No. 331,059

17 Claims. (Cl. 260—78)

This invention relates to polymeric materials and more particularly to fiber-forming synthetic polymers.

This invention has as an object a new method for preparing fiber-forming or superpolymers comprising ester and amide groups. A further object is a method in which amino alcohols can be successfully used as a reactant in making these polymers. A still further object is the manufacture of new and improved fiber-forming polymers. Other objects will appear hereinafter.

These objects are accomplished by reacting with heat treatment, in the manner hereinafter more particularly pointed out, a mixture comprising bifunctional polyamide-forming and bifunctional polyester-forming reactants at least one of which consists of a monoaminomonohydric alcohol, and continuing the polymerization reaction until a polymer is formed that can be formed into pliable filaments. Filaments made from the polymers are of such a character that they can be cold drawn into fibers which, as evidenced by X-ray analysis, exhibit molecular orientation along the fiber axis.

The minimum reactants in the above mentioned mixture consists of the amino alcohol and a dibasic carboxylic acid, the ester groups of the polymer being obtained through interaction of one carboxyl group of the dibasic acid with the hydroxyl of the amino alcohol, and the amide groups being obtained through interaction of the other carboxyl group of the dibasic acid with the amino group of the amino alcohol. In addition to these reactants the mixture may contain other bifunctional reactants, the functional groups of which also interact with those of either or both the amino alcohol and dibasic carboxylic acid to form ester or amide groups. Examples of the reaction mixtures that may be used are:

I. Amino alcohols and dibasic acids
II. Amino alcohols, dibasic acids and diamines
III. Amino alcohols, dibasic acids and amino acids
IV. Amino alcohols, dibasic acids and hydroxy acids In preparing the ester-amide polymers the reactants should be used in such proportions that the complementary reacting groups are present in substantially equimolecular proportions. Thus, in I the amino alcohol and the dibasic acid should be used in equimolecular amounts, in II the dibasic acid should be used in amount equimolecularly equivalents to the sum of the amino alcohol and diamine, etc. However, a small excess, up to about 5 molar per cent, of the amino alcohol, dibasic acid, or other reactant may be employed to advantage if a viscosity stable polymer is desired, i. e. a polymer which does not undergo material change in viscosity on further heating. A small amount of monoamine or monocarboxylic acid may be used for the same purpose.

The fiber-forming polymers of this invention preferably consist substantially solely of one or more of the above mentioned groups of reactants. For the purposes of the present invention the amino alcohol must be present in substantial amount which is not less than 5 molar per cent, preferably from 10% to 50%, of the other reactants.

In the preferred practice of the invention in which an amino alcohol having a chain of less than 4 atoms separating the amino and hydroxyl groups is used, as for instance, ethanolamine, the dibasic carboxylic acid selected is one having a radical length, as defined in Patent 2,130,948, of at least 6, and the reaction is carried out by a two stage heat treatment, the first of which is conducted below 180° C., preferably at 150° to 180° C. for at least two hours to effect a substantial degree of polymerization and the second of which may, if necessary or desired, be conducted above 180° C., e. g. at 180° to 250° C., to continue the polymerization until the product has a sufficiently high molecular weight to exhibit fiber-forming properties. Preferably the second stage of the reaction is carried out under reduced pressure. By conducting the first stages of the reaction below 180° C. the tendency to form cyclic products of the oxazoline or oxazine types, which are incapable of polymerization, instead of linear polymers is avoided. Where the amino alcohol has 4 or more atoms separating the amino and hydroxyl groups the above precautions as to radical length of the dibasic carboxylic acid and mode of heating are less important since these reactants have little or no tendency to form cyclic products.

It will be apparent therefore that the products of this invention are obtained by heating the above mentioned reaction mixtures under "polymerizing conditions" which means at polymerizing temperatures and, in the case of amino alcohols having a chain of less than 4 atoms separating the amino and hydroxyl groups, at a temperature below 180° C. for at least the first two hours of the reaction.

It is desirable to have water present during the first stage of the reaction since this renders the reaction mixture homogeneous and decreases frothing. It is desirable during the second stage of the polymerization, which is usually conducted under a pressure of 2 to 4 mm., to agitate the mixture by allowing a stream of nitrogen or carbon dioxide to bubble slowly through the reaction mixture. This prevents oxygen from coming in contact with the reaction mixture and aids in the removal of the by-product, which in most cases will be water.

The fiber-forming stage can be tested for by touching the molten polymer with a rod and drawing the rod away; if this stage has been reached, a continuous filament of considerable strength and pliability is formed. The polymers of this invention do not acquire the properties desired for most uses until they possess fiber-forming and cold drawing properties. In other words, great strength, toughness, flexibility and elasticity appear simultaneously with fiber-forming properties. These properties are generally not reached until the intrinsic viscosity is above 0.3, intrinsic viscosity being defined as in Patent 2,130,948. The best products have intrinsic viscosities above 0.5.

The polymers of this invention are soluble in mixtures of chloroform and methanol. For the most part they are soluble in chloroform alone. They are also readily soluble in phenol and formic acid. Hot ethanol, isopropanol, butanol, acetone and ethyl acetate also act as solvents for the polymers.

The following examples, in which parts are by weight, are illustrative of the preparation and application of the products of this invention.

*Example I*

A mixture of 12.21 parts of ethanolamine (NH$_2$CH$_2$CH$_2$OH)

40.43 parts of sebacic acid, and 10 parts of water was heated for 2 hrs. at 176° C./atm., 4 hrs. at 176° C./20 mm., and finally for 36 hrs at 176° C./2 mm. A slow stream of nitrogen was bubbled through the mixture to cause agitation and to facilitate the removal of water. The product was a clear, tough polymer melting at 105–110° C. and having an intrinsic viscosity of 0.70, a melt viscosity of 3,995 poises at 139° C. and a hardness of 40 g. on the Pfund scale. Oriented films of the polymer had a tensile strength of 17,000 lbs./sq. in. or 19,500 lbs./sq. in. calculated on the dimensions at break.

*Example II*

A mixture containing 274.8 parts of ethanolamine, 657.4 parts of adipic acid and 100 parts of water was heated for 2 hrs. at 170° C. under atmospheric pressure and then for 36 hrs. at the same temperature but under a pressure of 2 mm. The product obtained was a high molecular weight, hard, tough, fluorescent polymer which had a softening point near 68° C.

*Example III*

A mixture of 12.21 parts of ethanolamine, 40.43 parts of sebacic acid, 7.90 parts of hexamethylenediammonium sebacate, and 10 parts of water was heated for 4 hrs. at 170° C./atm., 8 hrs. at 176° C./20 mm., 7 hrs. at 176° C./2 mm., and finally for 23 hrs. at 200° C./2 mm. The product obtained was a clear, transparent, tough polymer melting at 97° C. and having an intrinsic viscosity of 0.41, a melt viscosity of 5,540 poises at 139° C., and a hardness of 30 g. on the Pfund scale.

Oriented films thereof had a tensile strength of 22,500 lbs./sq. in. (27,000 lbs./sq. in. based on dimensions at break).

*Example IV*

A mixture of 11 parts of α-aminodecanoic acid, 10.20 parts of ethanolamine, 31.51 parts of sebacic acid, and 10 parts of water was heated for 4 hrs. at 176° C./atm., 4 hrs. at 176° C./20 mm., and finally for 26 hrs. at 176° C./2 mm. The product thus obtained was a clear, colorless, tough, horny polymer which melted at 96° C., and had an intrinsic viscosity of 0.56, a melt viscosity of 1,940 poises at 176° C., and a hardness of 36 g. on the Pfund scale. Oriented films of the ester-amide interpolymer had a tensile strength of 14,850 lbs./sq. in. (19,200 lbs./sq. in. based on dimensions at break).

*Example V*

A mixture of 10.20 parts of ethanolamine, 7.36 parts of ω-hydroxymyristic acid, 31.51 parts of sebacic acid and 10 parts of water was heated for 4 hrs. at 176° C./atm., 4 hrs. at 176° C./20 mm., 16 hrs. at 176° C./2 mm., and finally for 6 hrs. at 200° C./2 mm. The product obtained was a clear, flexible, tough polymer which melted at 98° C., and had an intrinsic viscosity of 0.63, and a hardness of 60 g. on the Pfund scale. Oriented films thereof had a tensile strength of 7,140 lbs./sq. in. (8,640 lbs./sq. in. based on dimensions at break).

The amino alcohols are preferably those of the formula HO—R—NH$_2$, where R represents a saturated divalent hydrocarbon radical with a chain length of at least two carbon atoms. Amino alcohols of this kind in addition to ethanolamine are 3-aminopropanol, 4-aminobutanol, 6-aminohexanol, 10-aminodecanol, and

p—NH$_2$CH$_2$—C$_6$H$_4$—CH$_2$OH

Branched chain amino alcohols of formulae

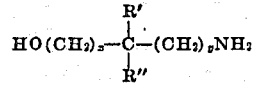

and

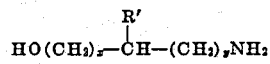

may also be used, where $x$ and $y$ are integers and R' and R" are monovalent hydrocarbon radicals. Amide-forming derivatives of the amino alcohols, e. g. the N-formyl derivatives thereof, may be used in place of the amino alcohols.

The dibasic acids are preferably those of formula HOOC—R—COOH where R represents a saturated divalent hydrocarbon radical with a chain length of at least four carbon atoms. Dibasic acids such as terephthalic acid and

HOOCCH$_2$CH$_2$CH$_2$SCH$_2$CH$_2$CH$_2$COOH may also be used. Where the amino alcohol used has four or more atoms in the chain separating the amide-forming groups, dibasic acids having a shorter chain separating the carboxyl groups may also be employed, examples being malonic and glutaric acids.

The diamines most useful in the practice of this invention are those of the formula NH$_2$RNH$_2$ where R represents saturated divalent hydrocarbon radicals with a chain length of at least two carbon atoms. These diamines include ethylene-diamine, hexamethylenediamine, 3-methyl-hexamethylenediamine, and decamethylenediamine. However, aromatic diamines such as m-phenylenediamine may also be used. Diamines containing hetero atoms in the chain separating the amino groups may also be used, a typical example being 3,3'-diaminodipropyl ether. Amide-forming derivatives of the diamines, e. g. the N-formyl, or N,N'-diformyl derivatives, may also be used.

When hydroxy acids are used, the best results are obtained with those of the formula HO—R—COOH where R represents saturated divalent hydrocarbon radicals. Examples of these acids are ω-hydroxycaproic, ω-hydroxydecanoic, ω-hydroxymyristic acid.

The preferred amino acids are those of formula NH₂RCOOH or amide-forming derivatives thereof, where R is a divalent hydrocarbon radical having a chain of at least five atoms, examples being 6-aminocaproic acid, caprolactam, 9-aminononanoic acid, and 11-aminoundecanoic acid. 12-amino-stearic acid is another example of a suitable amino acid.

It is to be understood that the amino alcohols, dibasic acids, diamines, hydroxy acids, and amino acids mentioned above may be replaced by suitable amide-forming or ester-forming derivatives of these compounds. This applies also to the appended claims.

It should be noted that amino alcohols contain both an amide-forming and an ester-forming group. Polymers formed by the reaction of amino alcohols with dibasic acids therefore contain both amide and ester groups as an integral part of the main chain of atoms in the polymer chain. It will be apparent therefore that these polymers, which can also be referred to as ester-amide polymers, will differ in structure from other ester-amide polymers derived with the use of a dibasic acid, e. g. the polymers derived from dibasic acids, glycols and diamines, since in the latter case each of the amide-forming and ester-forming groups complementary to the carboxyl groups in the dibasic acid come from separate reactants. The products of this invention also differ in properties from the previously prepared ester-amide interpolymers. In particular the present polymers have greater solubility. For example, ester-amide polymers prepared without the use of an amino alcohol and having an amide content of 50% are practically insoluble in all the ordinary organic solvents, whereas those of the type herein described having an amide content of 50% are remarkably soluble in many common organic solvents, e. g. chloroform and alcohol-chloroform mixtures. This good solubility is probably due to the symmetrical arrangement of the ester and amide groups.

On hydrolysis with mineral acids the polymers of this invention revert to monomeric amide-forming and ester-forming reactants. For example, a polymer derived from an amino alcohol and a dibasic acid will yield, on hydrolysis with hydrochloric acid, a mixture comprising an amino alcohol hydrochloride and a dibasic acid.

The unusual solubility of the polymers of this invention in mixed solvents such as methanol and chloroform makes them valuable as film-forming materials and as ingredients in coating and impregnating compositions for wood, cloth, leather, paper, etc. Due to their unusual toughness, pliability and clarity, they are advantageously used in the preparation of fibers and safety glass interlayers. The present polymers are also useful as electrical insulation for wires, cables, and for the windings on motors and dynamo-electric machines. These polymers are in general microcrystalline in structure rather than resinous. By reason of the fact that cold drawn filaments of the polymers tend to retract when heated they are useful in making felted articles. It is to be understood that in these and other uses the polymers may be admixed with other materials such as plasticizers, pigments, dyes, resins and cellulosic materials.

As many apparently widely different embodiments of this invention may be made without departing from the spirit and scope thereof, it is to be understood that I do not limit myself to the specific embodiments thereof except as defined in the appended claims.

I claim:

1. A process for making polymers which comprises heating at reaction temperature but below 180° C. a reaction mixture comprising essentially bifunctional reactants which comprise a monoaminomonohydric alcohol, in which the amino nitrogen carries at least one hydrogen atom and which has a chain of less than four atoms separating the amino and hydroxyl groups, and a dibasic carboxylic acid having a radical length of at least six, and then heating the low molecular weight polymer thus obtained at polymerizing temperatures until a polymer is formed which can be formed into pliable filaments, the carboxyl groups in said mixture of bifunctional reactants being present in amount substantially equimolecularly equivalent to the sum of the amino and alcoholic hydroxyl groups.

2. A process for making polymers which comprises heating a reaction mixture comprising essentially bifunctional reactants which comprise ethanolamine and a dibasic carboxylic acid having a radical length of at least six at 150° to 180° C. until most of the reactants have combined, and then heating the low molecular weight polymer thus obtained at 180°–250° C. until a polymer is formed which is capable of being formed into fibers which by characteristic X-ray patterns exhibit orientation along the fiber axis, the carboxyl groups in said mixture of bifunctional reactants being present in amount substantially equimolecularly equivalent to the sum of the amino and alcoholic hydroxyl groups.

3. A process for making polymers which comprises heating a reaction mixture comprising essentially bifunctional reactants which comprise a monoaminomonohydric alcohol in which the amino nitrogen carries at least one hydrogen atom, a dibasic carboxylic acid having a radical length of at least six and water for at least two hours at a temperature of 150° to 180° C., and then continuing the heating at polymerizing temperatures under reduced pressure until the polymer can be drawn into fibers exhibiting by X-ray patterns orientation along the fiber axis, the carboxyl groups in said mixture of bifunctional reactants being present in amount substantially equimolecularly equivalent to the sum of the amino and alcoholic hydroxyl groups.

4. A process for making polymers which comprises heating a reaction mixture comprising essentially bifunctional reactants which comprise a monoaminomonohydric alcohol in which the amino nitrogen carries at least one hydrogen atom, a dibasic carboxylic acid, having a radical length of at least six and a diamine in which each amino nitrogen carries at least one hydrogen atom, under polymerizing conditions until a polymer is formed which can be formed into fibers showing by characteristic X-ray patterns orientation along the fiber axis, the carboxyl groups in said mixture of bifunctional reactants being present in amount substantially equimolecularly equivalent to the sum of the amino and alcoholic hydroxyl groups.

5. A polymer comprising the reaction product of reactants comprising essentially bifunctional reactants which comprise ethanolamine and a dibasic carboxylic acid having a radical length of at least six, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

6. A polymer comprising the reaction product of reactants comprising essentially bifunctional reactants which comprise a monoaminomonohydric alcohol in which the amino nitrogen carries at least one hydrogen atom, a dibasic carboxylic acid, having a radical length of at least six and a diamine in which each amino nitrogen carries at least one hydrogen atom, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

7. A fiber-forming polymer which yields on hydrolysis with hydrochloric acid a mixture comprising essentially bifunctional reactants which comprise a dibasic carboxyl acid having a radical length of at least six and the hydrochloride of a monoaminomonohydric alcohol in which the amino nitrogen carries at least one hydrogen atom, the carboxyl groups in said mixture of bifunctional reactants being present in amount substantially equimolecularly equivalent to the sum of the amino and alcoholic hydroxyl groups.

8. A polymer comprising the reaction product of reactants comprising essentially bifunctional reactants which comprise a monoaminomonohydric alcohol in which the amino nitrogen carries at least one hydrogen atom, a dibasic carboxyl acid having a radical length of at least six and a monoaminomonocarboxylic acid in which the amino nitrogen carries at least one hydrogen atom, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

9. A polymer comprising the reaction product of reactants comprising essentially bifunctional reactants which comprise a monoaminomonohydric alcohol in which the amino nitrogen carries at least one hydrogen atom, a dibasic carboxylic acid, having a radical length of at least six and a monohydroxymonocarboxylic acid, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

10. A process including condensing by heating a mixture including a monoalkylolamine which has at least one hydrogen atom attached to the nitrogen atom and an aliphatic dicarboxylic acid which has at least four carbon atoms between the carboxyl groups under polymerizing conditions until substantially completely reacted, the carboxyl groups in said mixture being present in an amount substantially equimolecularly equivalent to the sum of the amino and alcoholic hydroxyl groups.

11. A process including condensing by heating a mixture including monoethanolamine with sebacic acid under polymerizing conditions until substantially completely reacted, the carboxyl groups in said mixture being present in an amount substantially equimolecularly equivalent to the sum of the amino and alcoholic hydroxyl groups.

12. A polymer comprising the reaction product produced by condensing by heating a mixture including a monoalkylolamine which has at least one hydrogen atom attached to the nitrogen atom and an aliphatic dicarboxylic acid which has at least four carbon atoms between the carboxyl groups under polymerizing conditions until substantially completely reacted, the carboxyl groups in said mixture being present in an amount substantially equimolecularly equivalent to the sum of the amino and alcoholic hydroxyl groups.

13. A process for making polymers which comprises heating a reaction mixture comprising essentially bifunctional reactants which comprise a monoaminomonohydric alcohol in which the amino nitrogen carries at least one hydrogen atom, a dibasic carboxylic acid having a radical length of at least six, and a monoaminocarboxylic acid in which the amino nitrogen carries at least one hydrogen atom, under polymerizing conditions until a polymer is formed which can be formed into fibers showing by characteristic X-ray patterns orientation along the fiber axis, the carboxyl groups in said mixture of bifunctional reactants being present in amount substantially equimolecularly equivalent to the sum of the amino and alcoholic hydroxyl groups.

14. A process for making polymers whch comprises heating a reaction mixture comprising essentially bifunctional reactants which comprise a monoaminomonohydric alcohol in which the amino nitrogen carries at least one hydrogen atom, a dibasic carboxylic acid having a radical length of at least six, and a monohydroxymonocarboxylic acid under polymerizing conditions until a polymer is obtained which can be formed into fibers exhibiting by characteristic X-ray patterns orientation along the fiber axis, the carboxyl groups in said mixture of bifunctional reactants being present in amount substantially equimolecularly equivalent to the sum of the amino and alcoholic hydroxyl groups.

15. A polymer comprising the reaction product obtained by heating at polymerizing temperatures, and for an initial period of at least two hours at a temperature below 180° C., a mixture comprising monoethanolamine and sebacic acid, the carboxyl groups in said mixture being present in an amount substantially equimolecularly equivalent to the sum of the amino and alcoholic hydroxyl groups.

16. The process set forth in claim 10 in which said amino alcohol has a chain of at least four atoms separating the amino and hydroxyl groups.

17. The polymer set forth in claim 12 in which said amino alcohol has a chain of at least four atoms separating the amino and hydroxyl groups.

ROBERT EDWARD CHRIST.